United States Patent
Kaw et al.

(10) Patent No.: US 10,855,552 B2
(45) Date of Patent: Dec. 1, 2020

(54) DYNAMIC USER INTERFACE COMPUTING PLATFORM

(71) Applicant: Bank of America Corporation, Charlotte, NC (US)

(72) Inventors: Sidhartha Kaw, Waxhaw, NC (US); Vishwas Korde, Matthews, NC (US); Kanstantsin Osipov, Chicago, IL (US); Md Kamrul Hasan Pulok, Denver, CO (US); Subbarayalu Muthurangan, Naperville, IL (US); Johny Rajkumar, Charlotte, NC (US); Kumar Sumit, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 47 days.

(21) Appl. No.: 15/913,371

(22) Filed: Mar. 6, 2018

(65) Prior Publication Data

US 2019/0280943 A1 Sep. 12, 2019

(51) Int. Cl.
*G06F 17/00* (2019.01)
*H04L 12/24* (2006.01)
(Continued)

(52) U.S. Cl.
CPC ............ *H04L 41/22* (2013.01); *G06F 3/0481* (2013.01); *H04L 41/0843* (2013.01);
(Continued)

(58) Field of Classification Search
CPC .................................. G06F 8/38; G06F 9/451
See application file for complete search history.

(56) References Cited

U.S. PATENT DOCUMENTS 8,788,577 B2   7/2014 Podjamy
8,868,637 B2   10/2014 Rosenstein et al.
(Continued)

OTHER PUBLICATIONS

Investopedia, Daily Trading Limit, retrieved from http://www.investopedia.com/terms/d/daily_trading_limit.asp, archived Sep. 24, 2017, 2 pages.*

(Continued)

*Primary Examiner* — Scott Baderman
*Assistant Examiner* — Barbara M Level
(74) *Attorney, Agent, or Firm* — Banner & Witcoff, Ltd.; Michael A. Springs

(57) ABSTRACT

Systems, apparatuses, and methods are described for a dynamic user interface computing platform which may store user interface templates and generate corresponding user interfaces. An administrator may configure a user interface template with a form comprising one or more fields, layout preferences, and one or more rules. A user may, using a requesting device, request a user interface corresponding to the user interface template. The dynamic user interface computing platform may generate a user interface based on the user interface template, the layout preferences, and the one or more rules, and may send the user interface to the requesting device. The user may, using the user interface, submit data to the dynamic user interface computing platform. The dynamic user interface computing platform may validate the received data and submit it to another computing device.

17 Claims, 4 Drawing Sheets

(51) Int. Cl.
*G06F 3/0481* (2013.01)
*A63F 13/63* (2014.01)
*A63F 13/87* (2014.01)
*H04L 29/08* (2006.01)

(52) U.S. Cl.
CPC ............... *A63F 13/63* (2014.09); *A63F 13/87* (2014.09); *H04L 67/141* (2013.01)

(56) References Cited

U.S. PATENT DOCUMENTS

| | | | |
|---|---|---|---|
| 8,930,257 B1 * | 1/2015 | Howorka | G06Q 40/04 705/37 |
| 9,122,650 B1 | 9/2015 | Colton et al. | |
| 9,244,709 B2 | 1/2016 | Aslam et al. | |
| 9,268,547 B2 | 2/2016 | Manion et al. | |
| 9,282,145 B2 | 3/2016 | Wei et al. | |
| 9,292,502 B2 | 3/2016 | Karlsen | |
| 9,361,345 B2 | 6/2016 | Podjamy | |
| 9,454,616 B2 | 9/2016 | Baikov et al. | |
| 9,513,885 B2 | 12/2016 | Warren | |
| 9,514,115 B2 | 12/2016 | Chen | |
| 9,560,121 B2 | 1/2017 | Aslam et al. | |
| 9,785,621 B2 | 10/2017 | Podjamy et al. | |
| 9,798,524 B1 | 10/2017 | Colton et al. | |
| 2003/0106039 A1 * | 6/2003 | Rosnow | G06Q 10/06 717/100 |
| 2006/0106706 A1 * | 5/2006 | LaBonty | G06Q 10/10 705/35 |
| 2009/0019313 A1 * | 1/2009 | Pokala | G06F 9/451 714/37 |
| 2011/0238505 A1 * | 9/2011 | Chiang | G06Q 30/00 705/14.69 |
| 2011/0270959 A1 * | 11/2011 | Schlusser | H04L 67/10 709/223 |
| 2012/0054095 A1 * | 3/2012 | Lesandro | G06Q 20/10 705/39 |
| 2012/0130853 A1 * | 5/2012 | Petri | G06Q 30/0609 705/26.35 |
| 2012/0137235 A1 * | 5/2012 | T S | G06F 8/34 715/763 |
| 2015/0163206 A1 * | 6/2015 | McCarthy | G06F 21/6227 713/171 |
| 2015/0180806 A1 * | 6/2015 | Honkala | H04L 51/28 709/206 |
| 2015/0269813 A1 * | 9/2015 | Severance | G06Q 40/04 463/9 |
| 2015/0287285 A1 * | 10/2015 | Shore | G07F 17/3218 463/25 |
| 2016/0050167 A1 * | 2/2016 | Ramachandran | H04L 67/42 709/204 |
| 2017/0075659 A1 | 3/2017 | Warren | |
| 2017/0351509 A1 | 12/2017 | Lora et al. | |
| 2018/0089412 A1 * | 3/2018 | Kopikare | G06F 40/186 |
| 2018/0095705 A1 * | 4/2018 | Roberts | G06F 3/1257 |
| 2019/0220922 A1 * | 7/2019 | Barkas | G06Q 40/12 |

OTHER PUBLICATIONS

Investopedia, Forex Market Hours, retrieved from http://www.investopedia.com/terms/forex/f/forex-market-trading-hours.asp, archived Nov. 4, 2017, 1 page.*

* cited by examiner

Your Name: 310

Currency Amount: 320

$00.00

SUBMIT 330

DYNAMIC USER INTERFACE COMPUTING PLATFORM

BACKGROUND

User interfaces in large enterprise systems often require regular updates which may make portions of the enterprise systems unavailable. For example, a user interface with a form used for a login process may require an update which newly mandates a minimum password length. Should such a user interface be generated by an application executable, to edit the user interface, an administrator may be forced to retrieve the application source code, locate the appropriate portion of the source code, edit the source code, compile and test the new version of the application (e.g., in a sandboxed environment), determine that the new version of the application is acceptable, and distribute the new version of the application across the enterprise system. This process may be undesirably and unacceptably long, error-prone, and complex, particularly where an enterprise may have a large number of different user interfaces (e.g., different data entry forms, login forms, and the like).

While numerous programming languages (e.g., Hypertext Markup Language ("HTML")) have made rapid development of user interfaces and forms easily, the availability of such languages does not mitigate many unique user interface challenges faced by larger enterprises. A large enterprise system may have hundreds of thousands of users in hundreds of different user groups using hundreds of different log-in forms from numerous countries. Each user group and country, for example, may have different rules on how a login process is to be performed. For example, systems in a particular country may be required by law to use certain authentication methods which may only be performed by particular web browsers. As another example, many large enterprise systems have legacy code and applications which are not easily modified such that rapid deployment of new user interface changes may be all but impossible. As such, general-purpose programming languages may be insufficient for serving all user interface needs at a large scale, and when such user interfaces require modification, significant time and effort may be required.

Such unavailability may result in significant harm to enterprises. For example, if the aforementioned user interface needed to be revised to patch a bug preventing some users from logging in, the enterprise may be forced to either cease operations until the patch is complete, or simply proceed such that some users remain incapable of logging in for a period of time. As another example, if the enterprise manages a large number of user interfaces which are collectively part of a multiplayer online video game, users incapable of logging in or playing via such interfaces may cancel subscriptions or otherwise complain about their inability to log in to the game.

Relatedly, such difficulties may cause an enterprise's user interfaces to become inconsistent, whether in terms of design or in terms of implementation. Because some user interfaces (e.g., legacy system forms) may be difficult to modify, such user interfaces may not be updates as regularly as more easily-modified user interfaces. As a result, such difficult-to-modify user interfaces may look older or lack additional beneficial features (e.g., two-factor authentication) as compared to their easy-to-modify counterparts. In some circumstances, difficult-to-modify user interfaces may generate further complexity, as additional applications are developed and/or code is added to an enterprise to support otherwise incompatible features. Over time, such added applications and code may result in undesirable execution delays, system bloat, and unnecessary enterprise system complexity.

As such, there is an ongoing need for improvements in generating, providing, and handling user interfaces.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Systems, apparatuses, and methods are described for a dynamic user interface computing platform which may be used by an administrator to create a user interface template comprising layout preferences, at least one field, and one or more rules.

According to some aspects, a dynamic user interface computing platform may be used by an administrator to create a user interface template corresponding to a form comprising at least one field. The at least one may comprise a text box for text entry, a drop-down menu, a button, or similar input methods. The user interface template may further comprise layout preferences and one or more rules. A user computing device may, via a network, request the user interface template. The dynamic user interface computing platform may generate a user interface from the user interface template based on, among other considerations, a device type of the dynamic user interface and the layout preferences. A user may, via the user computing device, use the received user interface to submit data. The dynamic user interface computing platform may receive the data, apply the one or more rules to the data, and evaluate and/or modify the data based on information received from an external database. The dynamic user interface computing platform may submit the data to one or more computing devices.

These and other features and advantages are described in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 3 depicts an illustrative example of an example user interface which may be generated from a user interface template stored by the dynamic user interface computing platform.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

A dynamic user interface computing platform may be a part of a large and popular text-based massively multiplayer online role playing game played by millions of players worldwide. The game may require a large number of user interfaces (e.g., HTML pages) with forms allowing players to log in, communicate with other players, and make gameplay decisions. Each user interface may need to differ based on, for example, the location of the player. For example, players in a first country may be on a different team and may be presented different content and options in each user interface than those in a second, different country. To make these user interfaces, an administrator may create a user interface template comprising a form with at least one field (e.g., a player name) and one or more rules (e.g., that the player name must be entered and must be longer than six characters). The user interface templates may be stored in the dynamic user interface computing platform. A user may request a user interface. In response, the dynamic user interface computing platform may retrieve the corresponding user interface template, generate the user interface, and transmit the user interface to the requesting user. The user may use the user interface to enter their player name and submit the player name, as data, to the dynamic user interface computing platform. The dynamic user interface computing platform may receive the data, apply the one or more rules to the data (e.g., confirm that the player name is longer than six characters), and submit the data to a computing device storing player names.

Figure 1:
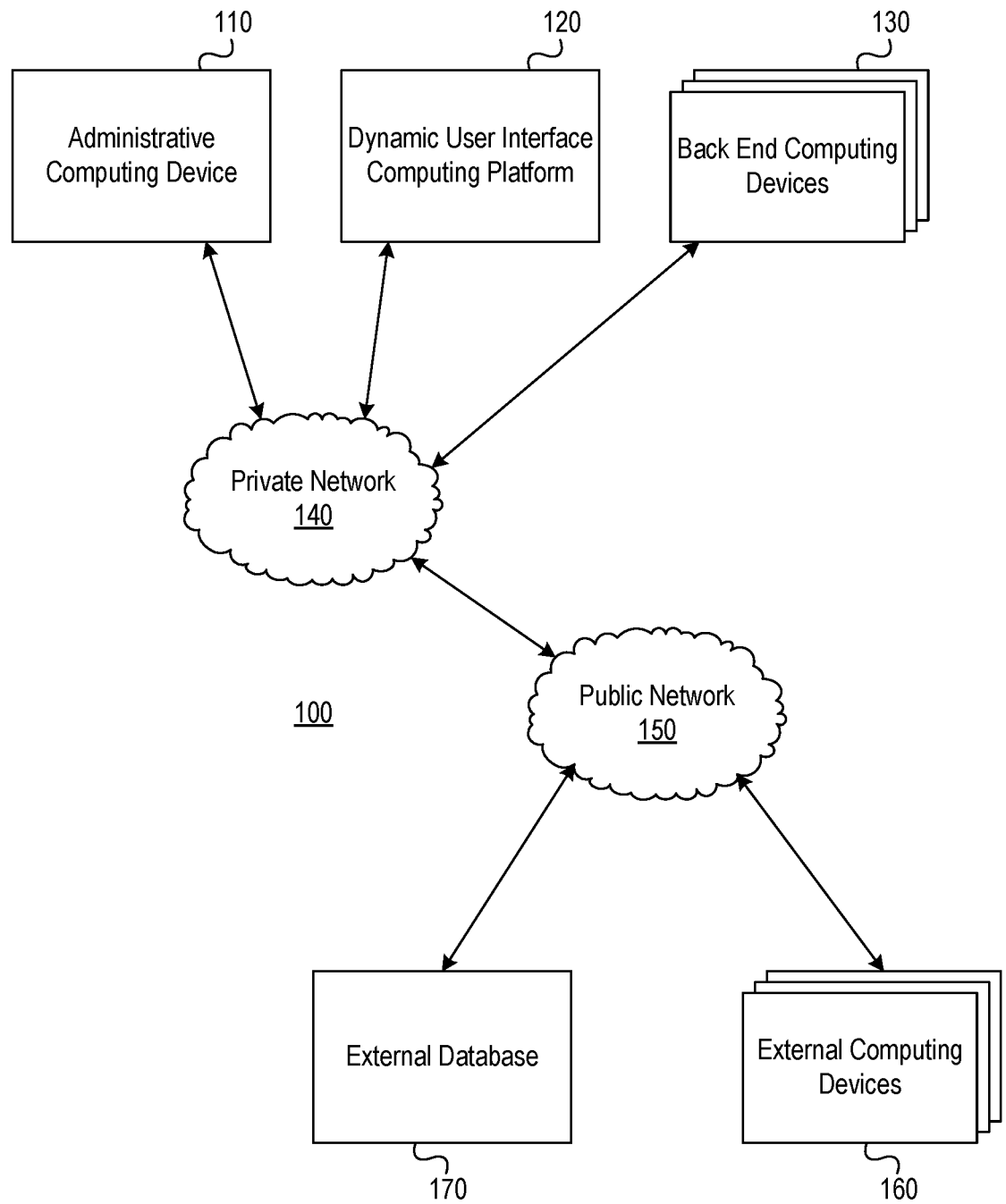
FIG. 1 depicts an illustrative example of an example network diagram upon which the dynamic user interface computing platform may execute.

Prior to discussing these and other features in greater detail, discussion will turn to FIG. 1, which shows a network diagram example 100 upon which features described herein may be implemented according to some aspects.

A dynamic user interface computing platform 120 may be one or more devices configured to manage user interface templates and generate user interfaces from those user interface templates. The dynamic user interface computing platform 120 may comprise a database for storing user interface templates created and/or modified by an administrator. The dynamic user interface computing platform 120 may be configured to generate the user interfaces from the user interface templates. The dynamic user interface computing platform 120 may be further configured to receive requests for user interfaces and/or user interface templates, and/or to receive commands and/or modifications from the administrative computing device. The dynamic user interface computing platform 120 may further be configured to allow an administrator to create and/or make changes to the user interface templates, one or more rules associated with the user interface templates, layout preferences associated with one or more user interface templates, and/or similar configuration parameters relating to the user interface templates. The dynamic user interface computing platform 120 may additionally and/or alternatively comprise and/or be communicatively coupled to a database (whether the same or different as the database used to store the user interface templates) for storing a log of data received from a user using a user interface generated from the user interface templates. The database may additionally or alternatively store user interface templates. The dynamic user interface computing platform 120 may comprise a variety of elements, such as an administration and/or configuration system, a user interface template generation system, one or more rules, a database of available fields and/or form components, and the like. For example, the dynamic user interface computing platform 120 may be a software suite comprising an administration panel, a user interface generation system including libraries of layouts, rules, fields, and the like, and a mechanism to store user interfaces in a database.

A private network 140 and/or a public network 150 may connect the dynamic user interface computing platform 120 to an administrative computing device 110, a plurality of back end computing devices 130, a plurality of external computing devices 160, and an external database 170. Though the private network 140 and public network 150 are shown as separated on FIG. 1, the private network 140 may be a portion of public network 150 (e.g., as a virtual private network ("VPN") executing on the Internet). In turn, either or both the private network 140 and the public network 150 may be logical and/or physical, and may comprise one or a plurality of interfaces (e.g., Ethernet, wireless communications such as 802.11 WiFi and/or cellular communications, coaxial cable communications, and/or other interfaces).

The administrative computing device 110 may be any computing device configured to access the dynamic user interface computing platform 120 and to make modifications to user interface templates. Though shown as separated from other computing devices in FIG. 1, the administrative computing device 110 may be part of the back end computing devices 130 and/or the external computing devices 160. For example, the external computing devices 160 may be a plurality of different types of user devices on a corporate network, and the administrative computing device 110 may be a company-issued smartphone which, when logged into the dynamic user interface computing platform 120 using appropriate credentials, allows an administrator to make edits to one or more user interface templates.

The back end computing devices 130 and the external computing devices 160 may be one or a plurality of computing devices which may access the dynamic user interface computing platform 120 to, for example, request a user interface and submit data via the user interface. Such computing devices may have device properties which may require a particular form of user interface. For example, one of the plurality of external computing devices 160 may be an older smartphone with a smaller screen resolution such that a user interface must be simplified for display (e.g., by reducing the horizontal resolution of the user interface). The back end computing devices 130 and/or the external computing devices 160 may be configured to transmit, separately from or along with a request for a user interface, device properties to the dynamic user interface computing platform 120. For instance, a web browser executing on one of the back end computing devices 130 may transmit an indication of a device resolution, the type of web browser executed, a color gamut which may be displayed on a display associated with the device, and other similar information. The back end computing devices 130 and/or the external computing devices 160 may be configured to determine (e.g., via a Global Positioning System ("GPS") device and/or network information) their respective location and transmit such locations to the dynamic user interface computing platform 120. The back end computing devices 130 and/or the external computing devices 160 may be configured to receive, store, and transmit authentication information corresponding to a user such that, for example, the dynamic user interface computing platform 120 may authenticate the user and/or the computing device used by the user.

The external database 170 may be any database which may be accessed by the dynamic user interface computing platform 120 to retrieve information relevant to a user interface. For example, if the user interface relates to a multiplayer game, the external database 170 may retrieve information associated with player teams. As another example, if the user interface relates to money, the external database 170 may be a database storing currency information, such as exchange rates and foreign exchange restrictions. The external database may store information which causes the dynamic user interface computing platform 120 to restrict access to one or more user interfaces. For example, a user in a first group may be restricted from accessing a user interface belonging to a second group. The external database 170 may be connected to the dynamic user interface computing platform 120 over the public network 150 and/or the private network 140. Though depicted as a single database in FIG. 1, the external database 170 may be a plurality of databases (e.g., a large number of different databases operated by different organizations and located worldwide).

Figure 2:
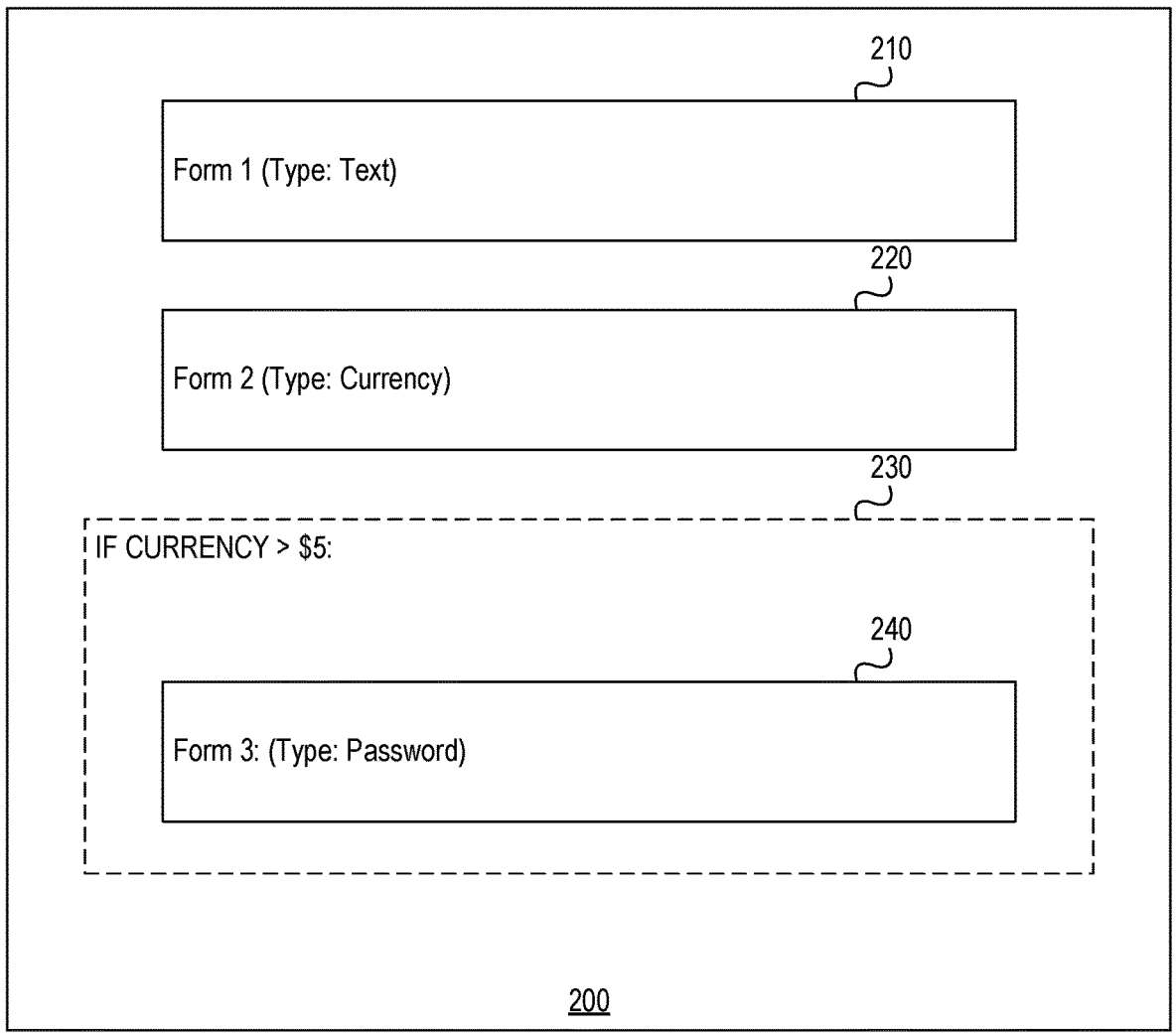
FIG. 2 depicts an illustrative example of an example user interface template which may be generated by an administrator and stored by the dynamic user interface computing platform.

FIG. 2 shows an example of a user interface template 200, which may be created or modified by an administrator via the dynamic user interface computing platform 120. For simplicity, the user interface template 200 shown comprises a text field 210, a currency field 220, and a password field 240. The password field 240 shown is subject to a rule 230 such that the password field 240 is only shown if the currency field 220 is greater than five dollars.

Thus, for example, the user interface template 200 shown may be used in a video game where players may bid real money on virtual items: the users may enter their player name into the text field 210, provide a bid (of, per the rule 230, no less than five dollars) in the currency field 220, and provide their password in the password field 240.

The dynamic user interface computing platform 120 may be configured to generate and store one or more user interface templates, like the user interface template 200. While the user interface template 200 is shown as a graphical form, the user interface template 200 may be stored in a manner which is not graphical and/or otherwise ready for data entry. For example, the user interface template may be stored as a plurality of Structured Query Language ("SQL") entries, each indicating a respective field, rule, layout preference, and/or other user interface setting.

The user interface template 200 may comprise information for a form. The form of a user interface template 200 may be any method in which a user may submit data. The form may comprise a number of fields for data entry. The dynamic user interface computing platform 120 may store information corresponding to the form, such as information relating to handling data submitted via the form. For example, if the form enables in-game chat, the dynamic user interface computing platform 120 may store information regarding how to send messages to appropriate back end computing devices 130 and/or external computing devices 160. Some fields may be configured as mandatory, whereas some fields may be configured as optional. Some or all fields may be configured as read-only. For example, the user interface template 200 may be configured as read-only during predetermined maintenance periods.

Fields (e.g., the text field 210, the currency field 220, and/or the password field 240) may be any method which a user may submit data. For example, a field may allow a user to enter text, select a choice from a plurality of choices, enter a number (e.g., a currency value), enter a password, and/or submit other data (e.g., a file, biometric information, and/or location data). Fields of the user interface template 200 may comprise a data type (e.g., text, currency, password), a name (e.g., first name, last name, trade amount), an identification (e.g., an identification number), field-specific validation rules (e.g., a last name must be only alphabetic characters), labels for the field (e.g., "Enter your First Name here:"), minimum and maximum lengths, and other such data or limitations. Fields of the user interface template 200 may comprise information for how and where data input into the field may be submitted, such as a destination address of a web service endpoint, processing system, or end system. The destination may depend on the purpose of the field and/or the user interface template 200. Fields selected in user interface template 200 may correspond to field templates. For example, the user interface template 200 may indicate that a field is to receive an e-mail, and a corresponding field template may provide parameters for such a field (e.g., that it must contain an "@" symbol, that the latter portion must be a domain name, and other similar parameters and/or restrictions). As such, the dynamic user interface computing platform 120 need not store all code required to generate a field. For example, the dynamic user interface computing platform 120 may store a minimum amount of data which may be later processed by the dynamic user interface computing platform 120 to generate a whole field.

The dynamic user interface computing platform 120 may store one or more rules (e.g. rule 230) corresponding to the form and/or the one or more fields. Rules may be conditional (e.g., one form may only appear based on another form), may place limits on one or more fields (e.g., requiring a password to be longer than a predetermined amount), may relate to data validation (e.g., providing that a certain regular expression must be met), and/or may relate to authentication (e.g., requiring authentication for a user to send a message to certain other users). Rules may specify which users may use all or part of a form. Rules may provide geographic restrictions on use of all or part of a form (e.g., preventing users in Country A from sending messages to users in Country B). Rules may correspond to whether a device requesting the form and/or the one or more fields is on the private network 140 and/or a trusted network, as opposed to the public network 150.

The user interface template 200 may comprise layout preferences (not shown), such as how a form may be laid out, color choices, Cascading Style Sheet ("CSS") code, and/or similar structural or aesthetic preferences. Such layout preferences may be based on, for example, the device properties of a device requesting the user interface template. As another example, the user interface template 200 may comprise a different number of rows based on criteria including, for instance, the width of the screen of the device requesting the user interface template. In turn, a field may be configured such that it appears in a particular row (e.g., a certain row number) or column based on criteria such as, for example, the number of rows. For example, the user interface template 200 may be configured to use one or more columns on a desktop computer but may be configured to use only a single column on a smartphone. The user interface template 200 may be configured to display a company logo based on determining that a requesting computing device is owned by the company.

FIG. 3 shows a user interface 300 which may be generated from the user interface template 200. The user interface 300 comprises a text field 310, a currency field 320, and a submission button 330. For illustrative purposes, the user interface 300 depicted in FIG. 3 may be generated from the user interface template 200 shown in FIG. 2.

The dynamic user interface computing platform 120 may be configured to generate, from the user interface template 200 and in response to a user request, the user interface 300. The user interface 300 may be generated for display by a requesting device. For example, if the requesting device is a smartphone, the dynamic user interface computing platform may generate, from the user interface template 200 and based on the layout preferences of the user interface template 200, a smartphone-friendly user interface 300. The generation of the user interface 300 may depend from software executing on the requesting device. For example, if the requesting device sends a request to the dynamic user interface computing platform 120 via a web browser, the user interface 300 may be generated in HTML. Generating the user interface 300 from the user interface template 200 may comprise retrieving additional templates, such as field templates corresponding to fields of the user interface template 200. For example, the dynamic user interface computing platform 120 may determine that the user interface template 200 refers to a password field, retrieve a corresponding password field template, and use the password field template to generate a corresponding password field in the user interface 300.

Aspects of the user interface template 200 may not be displayed in user interface 300. The one or more rules of the user interface template 200 and/or layout preferences may not be displayed but may, for example, affect how the user interface 300 is displayed, processed, and/or otherwise used. For example, FIG. 3 shows that the password field 240 is not shown because the currency field 320 is blank. In that example, if a value over five dollars was entered into currency field 320, then a third password field may appear.

The user interface 300 may comprise elements not in the user interface template 200, such as the submission button 330. The dynamic user interface computing platform 120 may be configured to add such elements based on configurations related to the device properties of the requesting device, rules corresponding to a plurality of user interfaces, or similar considerations. Similarly, elements of the user interface template 200, such as a user-friendly form title (e.g., "Your Name:" as shown in FIG. 3), may be configured to display in the user interface 300. For example, if a device requesting the user interface 300 is a smartphone, the dynamic user interface computing platform 120 may be configured to add a virtual keyboard to the user interface 300. As another example, if the geographic location of the computing device is required but cannot be determined, the dynamic user interface computing platform 120 may add a field asking the user to indicate their geographic location.

The user interface 300 may be configured to enforce the one or more rules of the user interface template 200. For example, the currency field 320 may be configured to only accept a password in a format specified by one or more rules of the user interface template 200. The dynamic user interface computing platform 120 may be configured to trust that the user interface 300 enforced such one or more rules, and/or the dynamic user interface computing platform 120 may be configured to enforce the one or more rules as well.

The user interface 300 may be configured to transmit, to the dynamic user interface computing platform 120, data corresponding to the fields. The manner in which such data may be transmitted to the dynamic user interface computing platform 120 may depend on the form of the user interface 300. For example, if the user interface 300 is an HTML form, then submission may be made via a Hypertext Transfer Protocol ("HTTP") "GET" and/or "POST" command.

The user interface 300 may be configured to refresh based on an update to the user interface template 200. The user interface 300 may receive a command from the dynamic user interface computing platform 120 to reload in response to a change, by an administrator, to the user interface template 200. The user interface 300 may additionally or alternatively be configured to refresh periodically to ensure that it corresponds to the latest version of the user interface template 200. The dynamic user interface computing platform 120 may be configured to refuse data received from a previous version of the user interface 300.

The user interface 300 may be configured to enable currency trading, including foreign exchange of currencies ("Forex"). For example, user interface 300 may comprise a form which enables a user to exchange one currency for another (e.g., via multiple versions of currency field 320). The one or more rules of the user interface template 200 may specify, for instance, a minimum and/or maximum amount of currency that may be bought or sold. Additionally or alternatively, the one or more rules may prohibit currency exchanges at certain times or under certain conditions, such as outside of a country's business hours. The user interface 300 may be regularly refreshed based on updates to the user interface template 200 corresponding to changes in exchange rates. The user interface 300 may be configured to transmit currency trades to the dynamic user interface computing platform 120, which may in turn transmit the trades to other computing devices to effectuate the trade.

Figure 4:
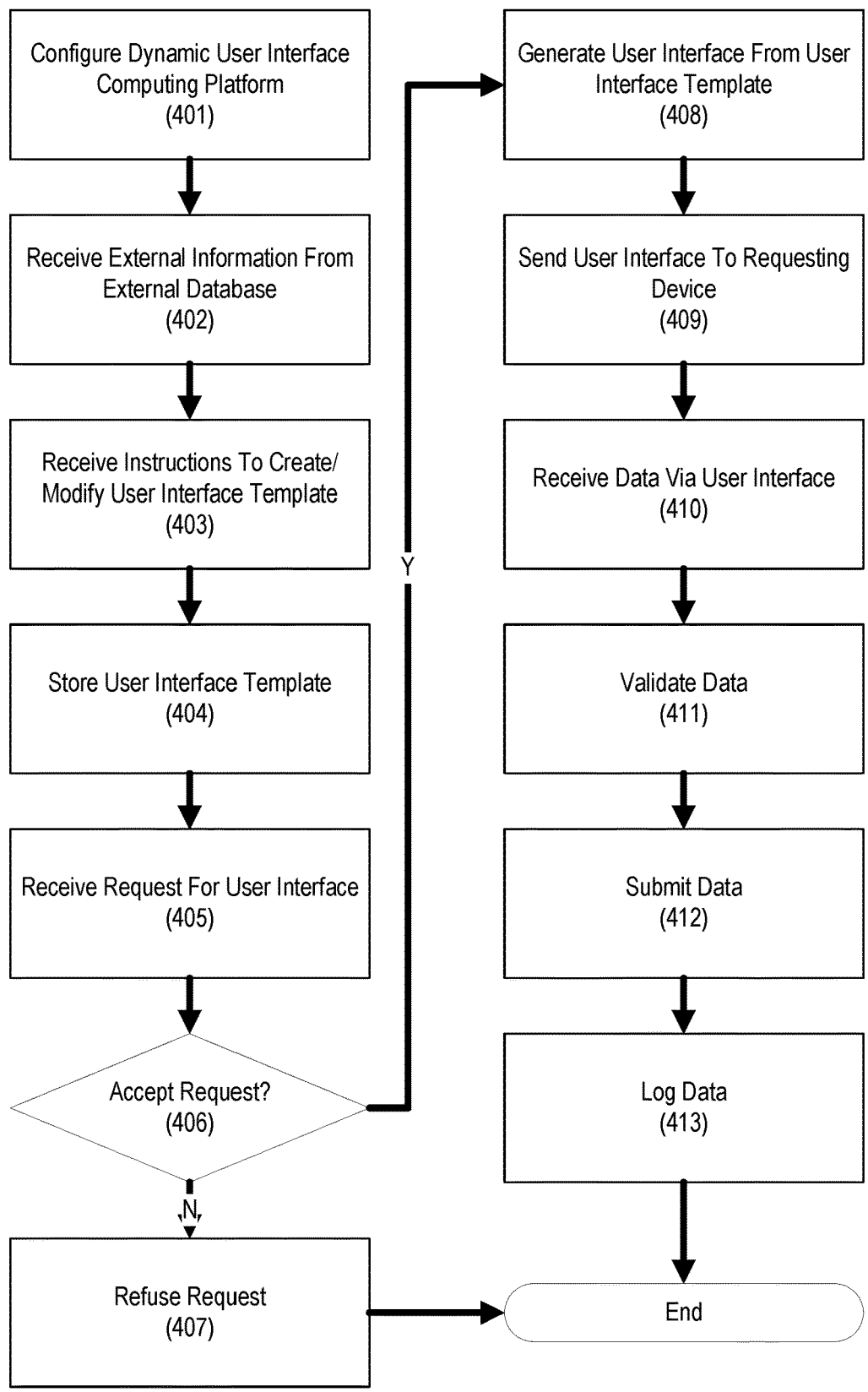
FIG. 4 depicts an illustrative example of a flowchart depicting actions which may be taken by or relate to the dynamic user interface computing platform.

FIG. 4 shows a flow chart comprising steps which may be taken by the dynamic user interface computing platform 120.

In step 401, the dynamic user interface computing platform 120 may be configured. Initial configuration settings (e.g., specifying which users are administrators) may be loaded. Default user interface templates (e.g., templates for text box fields) may be loaded and configured. The dynamic user interface computing platform 120 may establish and/or configure connections to other devices in the private network 140 and/or the public network 150.

In step 402, the dynamic user interface computing platform 120 may receive, from the external database 170, external information. Such information may comprise, for example, information associated with a currency and/or other financial data. Such information may additionally or alternatively comprise a restriction associated with a currency. For example, such information may comprise an indication that 1 Singaporean Dollar equals 0.75 United States Dollars, and that trading Singaporean dollars may only occur during Singaporean business hours and/or within countries which have entered into a specific treaty with Singapore.

In step 403, the dynamic user interface computing platform 120 may receive, from an administrator using an administrative computing device 110, one or more instructions to create and/or modify a user interface template corresponding to a form including at least one field. The administrator may add, modify, and/or remove layout preferences, one or more rules, and/or field(s). If the user interface template already exists, the administrator may modify the user interface template. In response to the modification of a preexisting user interface template, the dynamic user interface computing platform 120 may cause user interfaces corresponding to the user interface template to refresh and/or reload.

In step 404, the dynamic user interface computing platform 120 may store the user interface template in a memory. For example, the user interface template may be stored in Extensible Markup Language ("XML") and/or in one or more SQL entries. The user interface template may be stored in memory on a device separate from the dynamic user interface computing platform 120.

In step 405, the dynamic user interface computing platform 120 may receive, from a requesting device of one of either the plurality of back end computing devices 130 and/or the plurality of external computing devices 160, a request for a user interface. The request may comprise an indication of device properties of the requesting device, an indication of the location of the requesting device, authentication information corresponding to the requesting device and/or the user, and/or similar data. The request may be made over the private network 140 and/or the public network 150 and, in turn, may be made in response to establishing a connection between the requesting computing device and the dynamic user interface computing platform 120.

In step 406, the dynamic user interface computing platform 120 may determine whether to accept the request based on the request and, if applicable, the device properties, the location of the requesting device, and/or the authentication information. This step may comprise authenticating the user using the received authentication information. Authentication may comprise determining a user level of the user such that, for example, a first version of the user interface is presented to a low-level user and a second version of the user interface is presented to a high-level user. Unsupported requesting devices may be refused by the dynamic user interface computing platform 120. Similarly, requesting devices in unsupported locations may be refused by the dynamic user interface computing platform 120.

In step 407, if the dynamic user interface computing platform 120 decides to refuse the request, the dynamic user interface computing platform 120 may refuse the request with or without sending a message to the requesting device.

In step 408, if the dynamic user interface computing platform 120 decides to accept the request, the dynamic user interface computing platform 120 may generate, based on the user interface template, the one or more rules, and/or the layout preferences, the user interface. The user interface may be in a different format than the user interface template. The user interface may be configured based on and/or to enforce the one or more rules corresponding to the user interface template. Generating may comprise retrieving and applying a field template, layout preferences, graphics, and/or other user interface elements not part of the user interface template.

The user interface may additionally or alternatively be generated based on the device properties of the requesting device, the geographical location of the requesting device, or the like. For example, the dynamic user interface computing platform 120 may receive, from the external database 170, a restriction preventing a first type of trades originating from a certain geographical area, and the dynamic user interface computing platform 120 may modify the user interface to only allow a second type of trades based on determining that the requesting device is located in that geographical area. As another example, the dynamic user interface computing platform 120 may modify the user interface to provide additional functionality based on determining that the requesting device is located at a trusted network (e.g., in the private network 140).

In step 409, the dynamic user interface computing platform 120 may send, to the requesting device, the user interface. The user interface may be sent to the requesting device via the same or a different interface as the request was received. The requesting device may be configured to render and/or display the user interface received. The particular method in which the user interface may be rendered and/or displayed may depend on the format of the user interface. For example, if the user interface is HTML, rendering and display may be performed by a web browser executing on the requesting computing device.

In step 410, the dynamic user interface computing platform 120 may receive, via the user interface, data from the requesting device. A user may use the user interface to, using the requesting device and via the user interface, submit the data to the dynamic user interface computing platform 120. Such data may be formatted based on the user interface. For example, if the user interface is HTML, the data may be formatted based on an HTTP "GET" and/or "POST" request. The data may have been validated by the user interface based on the one or more rules.

In step 411, the dynamic user interface computing platform 120 may, based on the one or more rules, validate the data received. Validation may include refusing and/or modifying the data received. For example, if a rule specifies to allow trades only under fifty dollars, then the dynamic user interface computing platform 120 may be configured to refuse a trade for fifty-one dollars. As another example, if a rule specifies that a currency must be formatted with two decimals and the data requests a trade for "$50," then the dynamic user interface computing platform 120 may be configured to reformat the currency value to "$50.00." Validation may also include determining that the data received was submitted by the latest version of the user interface corresponding to the latest version of the user interface template. The dynamic user interface computing platform 120 may be configured to discard data received based on determining that the data was submitted by an older version of the user interface.

In step 412, the dynamic user interface computing platform 120 may be configured to submit the data received. Submission may include sending the validated data to an enterprise computing device, which may be one of the plurality of back end computing devices 130 and/or the plurality of external computing devices 160. Submitting the data may comprise causing the second computing device to perform an action. For example, where the dynamic user interface computing platform 120 corresponds to a trading platform, this step may comprise causing a trade to be effectuated based on the data received.

In step 413, the dynamic user interface computing platform 120 may be configured to store a log of the data received. Storing the log may be at a memory at the dynamic user interface computing platform 120 and/or at another computing device. For example, the dynamic user interface computing platform 120 may be configured to log all trades over a preselected amount.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits ("ASICs"), field programmable gate arrays ("FPGA"), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

Although examples are described above, features and/or steps of those examples may be combined, divided, omitted, rearranged, revised, and/or augmented in any desired manner. Various alterations, modifications, and improvements will readily occur to those skilled in the art. While some elements may be expressed as singular or plural, such elements may be either singular or plural in various embodiments. For example, though a single dynamic user interface computing platform 120 is described, multiple dynamic user interface computing platforms may be used in accordance with the features described herein. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
  receiving, by a dynamic user interface computing platform and from an external database, external information, the external information including information associated with a currency trade;
  generating, by the dynamic user interface computing platform and in response to receiving instructions from an administrator using an administrative computing device, a user interface template corresponding to a form, wherein the user interface template is in a first format, and wherein the user interface template comprises:
    indications of a plurality of data fields, wherein at least one data field of the plurality of data fields corresponds to the external information, and wherein the indications correspond to one of a plurality of data field templates including a format parameter for data entered into a data field corresponding to a data field template;
    layout preferences based on properties of a user computing device from which a request for user interface is received, the properties including at least a screen resolution of the user computing device;
    at least one rule corresponding to content permitted for entry in the plurality of data fields, the content permitted for entry including a limit on an amount of the currency trade;
    at least one rule corresponding timing restraints for the currency trade, the timing restraints based on business hours of a county associated with currency involved in the currency trade; and
    at least one rule for conditionally displaying one or more data fields of the plurality of data fields based on data input into a first data field;
  establishing, by the dynamic user interface computing platform and via a network, a connection with the user computing device;
  receiving, by the dynamic user interface computing platform, while the connection is established, and from the user computing device, device properties of the user computing device and a request for a user interface corresponding to the user interface template, wherein the request is associated with authentication data corresponding to a user of the user computing device;
  generating, by the dynamic user interface computing platform and after authenticating the user using the authentication data, the user interface based on the device properties of the user computing device, the request and the user interface template, wherein the user interface is in a second format that is configured to allow the user computing device to submit data, and wherein the user interface is formatted based on the layout preferences and wherein the second format is based on an access level of the user;
  sending, by the dynamic user interface computing platform, while the connection is established, and to the user computing device, the user interface, wherein the user computing device is configured to render and display the user interface;
  receiving, while the connection is established, by the dynamic user interface computing platform, and from the user computing device, first data, wherein the first data was submitted via the user interface, and wherein the first data indicates a second request for an action by an enterprise computing device associated with the dynamic user interface computing platform;
  determining, by the dynamic user interface computing platform, that the first data complies with the at least one rule corresponding to content permitted for entry in the plurality of data fields, the at least one rule corresponding to timing restraints for the currency trade and the at least one rule for conditionally displaying one or more data fields of the plurality of data fields based on data input into a first data filed; and
  transmitting the first data to the enterprise computing device, wherein the enterprise computing device is configured to use the first data to cause the action.

2. The method of claim 1, further comprising:
  receiving, by the dynamic user interface computing platform and from the external database, second information indicating a restriction; and preventing, by the dynamic user interface computing platform and based on the restriction, the user computing device from accessing the user interface.

3. The method of claim 1, further comprising:
receiving, by the dynamic user interface computing platform, a change to the user interface template; and
modifying, by the dynamic user interface computing platform and based on the change, the user interface template.

4. The method of claim 1, further comprising:
validating the first data to determine whether it was submitted via a version of the user interface other than a latest version of the user interface; and
discarding, by the dynamic user interface computing platform, the first data based on determining that the first data was sent via the version of the user interface other than the latest version.

5. The method of claim 1, further comprising:
determining, by the dynamic user interface computing platform and based on the request for the user interface, a geographic location of the user computing device; and
modifying, by the dynamic user interface computing platform, the user interface based on the geographic location of the user computing device.

6. The method of claim 1, further comprising:
retrieving, by the dynamic user interface computing platform and from the external database, a geographic restriction associated with a first geographic location;
determining, by the dynamic user interface computing platform and based on the request for the user interface, a second geographic location of the user computing device; and
preventing, by the dynamic user interface computing platform, the user computing device from accessing the user interface based on a comparison of the first geographic location and the second geographic location.

7. The method of claim 1, further comprising:
modifying, by the dynamic user interface computing platform and based on determining that the network is a trusted network, the at least one rule.

8. The method of claim 1, further comprising:
modifying, by the dynamic user interface computing platform, the user interface based on the authentication data.

9. The method of claim 1, wherein the external information further includes an exchange rate, and wherein the computing device is configured to cause a trade based on the first data and the exchange rate.

10. A dynamic user interface computing platform comprising:
one or more processors; and
memory storing instructions that, when executed by the one or more processors, cause the dynamic user interface computing platform to:
receive, from an external database, external information, the external information including information associated with a currency trade;
generate, in response to receiving instructions from an administrator using an administrative computing device, a user interface template corresponding to a form, wherein the user interface template is in a first format, and wherein the user interface template comprises:
indications of a plurality of data fields, wherein at least one data field of the plurality of data fields corresponds to the external information, and wherein the indications correspond to one of a plurality of data field templates including a format parameter for data entered into a data field corresponding to a data field template;
layout preferences based on properties of a user computing device from which a request for user interface is received, the properties including at least a screen resolution of the user computing device;
at least one rule corresponding to content permitted for entry in the plurality of data fields, the content permitted for entry including a limit on an amount of the currency trade;
at least one rule corresponding timing restraints for the currency trade, the timing restraints based on business hours of a county associated with currency involved in the currency trade; and
at least one rule for conditionally displaying one or more data fields of the plurality of data fields based on data input into a first data field;
establish, via a network, a connection with the user computing device;
receive, while the connection is established and from the user computing device, device properties of the user computing device and a request for a user interface corresponding to the user interface template, wherein the request is associated with authentication data corresponding to a user of the user computing device;
generate, after authenticating the user using the authentication data, the user interface based on the device properties of the user computing device, the request and the user interface template, wherein the user interface is in a second format that is configured to allow the user computing device to submit data, and wherein the user interface is formatted based on the layout preferences and wherein the second format is based on an access level of the user;
send, while the connection is established and to the user computing device, the user interface, wherein the user computing device is configured to render and display the user interface;
receive, while the connection is established and from the user computing device, first data, wherein the first data was submitted via the user interface, and wherein the first data indicates a second request for an action by an enterprise computing device associated with the dynamic user interface computing platform;
determine that the first data complies with the at least one rule corresponding to content permitted for entry in the plurality of data fields, the at least one rule corresponding to timing restraints for the currency trade and the at least one rule for conditionally displaying one or more data fields of the plurality of data fields based on data input into a first data filed; and
transmit the first data to the enterprise computing device, wherein the computing device is configured to use the first data to cause the action.

11. The dynamic user interface computing platform of claim 10, wherein the instructions, when executed by the one or more processors, further cause the dynamic user interface computing platform to:
receive, from the external database, second information indicating a restriction; and prevent, based on the restriction, the user computing device from accessing the user interface.

12. The dynamic user interface computing platform of claim 10, wherein the instructions, when executed by the one or more processors, further cause the dynamic user interface computing platform to:
receive a change to the user interface template; and
modify, based on the change, the user interface template.

13. The dynamic user interface computing platform of claim 10, wherein the instructions, when executed by the one or more processors, further cause the dynamic user interface computing platform to:
validate the first data to determine whether it was submitted via a version of the user interface other than a latest version of the user interface; and
discard the first data based on determining that the first data was sent via the version of the user interface other than the latest version.

14. The dynamic user interface computing platform of claim 10, wherein the instructions, when executed by the one or more processors, further cause the dynamic user interface computing platform to:
determine, based on the request for the user interface, a geographic location of the user computing device; and
modify the user interface based on the geographic location of the user computing device.

15. The dynamic user interface computing platform of claim 10, wherein the instructions, when executed by the one or more processors, further cause the dynamic user interface computing platform to:
retrieve, from the external database, a geographic restriction associated with a first geographic location;
determine, based on the request for the user interface, a second geographic location of the user computing device; and
prevent the user computing device from accessing the user interface based on a comparison of the first geographic location and the second geographic location.

16. A system comprising:
a dynamic user interface computing platform, having at least one processor and memory coupled to the at least one processor and storing computer-executable instructions that, when executed by the at least one processor, are configured to:
receive, from an external database, external information, the external information including information associated with a currency trade;
generate, in response to receiving instructions from an administrator using an administrative computing device, a user interface template corresponding to a form, wherein the user interface template is in a first format, and wherein the user interface template comprises:
indications of a plurality of data fields, wherein at least one data field of the plurality of data fields corresponds to the external information, and wherein the indications correspond to one of a plurality of data field templates including a format parameter for data entered into a data field corresponding to a data field template;
layout preferences based on properties of a user computing device from which a request for user interface is received, the properties including at least a screen resolution of the user computing device;
at least one rule corresponding to content permitted for entry in the plurality of data fields, the content permitted for entry including a limit on an amount of the currency trade;
at least one rule corresponding timing restraints for the currency trade, the timing restraints based on business hours of a county associated with currency involved in the currency trade; and
at least one rule for conditionally displaying one or more data fields of the plurality of data fields based on data input into a first data field;
establish, via a network, a connection with the user computing device;
receive, while the connection is established and from the user computing device, device properties of the user computing device and a request for a user interface corresponding to the user interface template, wherein the request is associated with authentication data corresponding to a user of the user computing device;
generate, after authenticating the user using the authentication data, the user interface based on the device properties of the user computing device, the request and the user interface template, wherein the user interface is in a second format that is configured to allow the user computing device to submit data, and wherein the user interface is formatted based on the layout preferences and wherein the second format is based on an access level of the user;
send, while the connection is established and to the user computing device, the user interface, wherein the user computing device is configured to render and display the user interface;
receive, while the connection is established and from the user computing device, first data, wherein the first data was submitted via the user interface, and wherein the first data indicates a second request for an action by an enterprise computing device associated with the dynamic user interface computing platform;
determine that the first data complies with the at least one rule corresponding to content permitted for entry in the plurality of data fields, the at least one rule corresponding to timing restraints for the currency trade and the at least one rule for conditionally displaying one or more data fields of the plurality of data fields based on data input into a first data filed; and
transmit the first data to the enterprise computing device, wherein the enterprise computing device is configured to use the first data to cause the action; and
the user computing device, configured to:
send the request for the user interface;
receive the user interface;
render and display the user interface;
receive, from the user using an input device, input corresponding to at least one of the plurality of data fields;
process the input to create the first data, wherein processing comprises validating the input; and
send, to the dynamic user interface computing platform, the first data.

17. The system of claim 16, further including instructions that, when executed, cause the dynamic user interface computing platform to:

validate the first data to determine whether it was submitted via a version of the user interface other than a latest version of the user interface; and discard the first data based on determining that the first data was sent via the version of the user interface other than the latest version.

\* \* \* \* \*